(12) United States Patent
Barnett et al.

(10) Patent No.: US 9,075,638 B2
(45) Date of Patent: Jul. 7, 2015

(54) EFFICIENT HOSTING OF VIRTUALIZED CONTAINERS USING READ-ONLY OPERATING SYSTEMS

(75) Inventors: George Barnett, Sydney (AU); David Cheney, Dulwich Hill (AU); Pramod Korathota, Sydney (AU)

(73) Assignee: Atlassian Corporation Pty Ltd., San Francisco, CA (US)

( * ) Notice: Subject to any disclaimer, the term of this patent is extended or adjusted under 35 U.S.C. 154(b) by 402 days.

(21) Appl. No.: 13/584,919

(22) Filed: Aug. 14, 2012

(65) Prior Publication Data

US 2014/0053150 A1    Feb. 20, 2014

(51) Int. Cl.
*G06F 9/455* (2006.01)
*G06F 9/445* (2006.01)

(52) U.S. Cl.
CPC . *G06F 9/455* (2013.01); *G06F 8/65* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 8,473,692 B2 * | 6/2013 | Rosales et al. | 711/153 |
| 8,539,137 B1 * | 9/2013 | Protassov et al. | 711/6 |
| 8,572,362 B2 * | 10/2013 | Castillo | 713/2 |
| 8,725,963 B1 * | 5/2014 | Emelianov et al. | 711/159 |
| 8,826,305 B2 * | 9/2014 | Filali-Adib et al. | 719/319 |
| 2003/0023839 A1 * | 1/2003 | Burkhardt et al. | 713/1 |
| 2004/0153639 A1 * | 8/2004 | Cherian et al. | 713/2 |
| 2006/0047946 A1 * | 3/2006 | Keith | 713/2 |
| 2006/0080385 A1 * | 4/2006 | Blandford et al. | 709/203 |
| 2006/0107030 A1 * | 5/2006 | Biondi et al. | 713/2 |
| 2006/0173912 A1 * | 8/2006 | Lindvall et al. | 707/104.1 |
| 2007/0250610 A1 * | 10/2007 | Haun et al. | 709/222 |
| 2008/0045342 A1 * | 2/2008 | Crowder et al. | 463/42 |
| 2008/0271017 A1 * | 10/2008 | Herington | 718/1 |
| 2009/0144538 A1 * | 6/2009 | Duda et al. | 713/2 |
| 2010/0122343 A1 * | 5/2010 | Ghosh et al. | 726/23 |
| 2011/0231638 A1 * | 9/2011 | Castillo | 713/2 |
| 2011/0231844 A1 * | 9/2011 | Ben-Shaul et al. | 718/1 |
| 2011/0296412 A1 * | 12/2011 | Banga et al. | 718/1 |
| 2012/0054742 A1 * | 3/2012 | Eremenko et al. | 718/1 |
| 2012/0059805 A1 * | 3/2012 | Bhogal et al. | 707/694 |
| 2012/0143929 A1 * | 6/2012 | Baratakke et al. | 707/827 |
| 2012/0198442 A1 * | 8/2012 | Kashyap et al. | 718/1 |
| 2012/0216075 A1 * | 8/2012 | Stakutis et al. | 714/23 |

(Continued)

OTHER PUBLICATIONS

Soltesz et al. "Container-based Operating System Virtualization: A Scalable, High-performance Alternative to Hypervisors" Mar. 23, 2007; (Soltesz_2007.pdf; pp. 1-13).*

(Continued)

*Primary Examiner* — Emerson Puente
*Assistant Examiner* — Hiren Patel
(74) *Attorney, Agent, or Firm* — Goodwin Procter LLP

(57) ABSTRACT

A single operating system image is shared among multiple running virtualized containers such that each running container interacts with underlying shared files and resources in system storage. Each container running on a server are provided the same image, which remains consistent among the containers. Each image is named and versioned and each container is configured in a manner that defines which underlying image is used when the container is started. When updates to the image are made, a new image is be generated, and the containers are be switched to the new image by changing configuration properties associated with the container and restarting the container.

14 Claims, 3 Drawing Sheets

(56) References Cited

U.S. PATENT DOCUMENTS

2013/0132950 A1* 5/2013 McLeod et al. .................... 718/1
2013/0275596 A1* 10/2013 Subramaniam ............... 709/226
2014/0033189 A1* 1/2014 Buswell ........................ 717/170

OTHER PUBLICATIONS

Kirill Kolyshkin "Virtualization in Linux"; Sep. 1, 2006 (Kolyshkin_2006.pdf; pp. 1-5).*

* cited by examiner

EFFICIENT HOSTING OF VIRTUALIZED CONTAINERS USING READ-ONLY OPERATING SYSTEMS

TECHNICAL FIELD

The invention relates generally to methods and systems for facilitating hosted data processing services, and more specifically to techniques for hosting large numbers of virtualized customer containers and associated operating system(s).

BACKGROUND INFORMATION

In computing, virtualization is a broad term that refers to the abstraction of computer resources. One useful definition is a technique for hiding the physical characteristics of computing resources from the way in which other systems, applications, or end users interact with those resources. This includes making a single physical resource, such as a server, an operating system, an application, or storage device, appear to function as multiple logical resources; or it can include making multiple physical resources, such as storage devices or servers, appear as a single logical resource.

One form of platform virtualization is commonly known as native or full virtualization, in which the virtual machine simulates enough hardware to allow an unmodified guest operating system ("OS") to be run in isolation. Typically, many instances can be run at once. Examples include VirtualBox, Virtual Iron, Virtual PC, VMware Workstation, VMware Server (formerly GSX Server), VMware ESX Server, QEMU, Parallels Desktop, Adeos, Mac-on-Linux, Win4BSD, Win4Lin Pro, and z/VM.

Partial virtualization, including address space virtualization, involves the virtual machine simulating multiple instances of a portion of the underlying hardware environment, particularly address spaces. Such an environment supports resource sharing and process isolation, but does not allow separate guest operating system instances. Although not generally viewed as a virtual machine category per se, this approach has been used in such systems as CTSS, the experimental IBM M44/44X, and arguably such systems as OS/VS1, OS/VS2, and MVS. Many more recent systems, such as Microsoft Windows and Linux also use this basic approach.

In paravirtualization, the virtual machine does not necessarily simulate hardware, but instead or in addition offers a special API that can only be used by modifying the guest OS. This system call to the hypervisor is referred to as a hypercall in Xen, Parallels Workstation, and Enomalism. It is implemented via a DIAG ("diagnose") hardware instruction in IBM's CMS under VM, which was the origin of the term hypervisor. Examples include Win4Lin 9x, Sun's Logical Domains, and z/VM.

Application virtualization is the execution of a desktop or server application locally, using local resources, within an appropriate virtual machine. This is in contrast with running the application as conventional local software, i.e. software that has been installed on the system. Such a virtualized application runs in a small virtual environment containing the components needed to execute, such as registry entries, files, environment variables, user interface elements, and global objects. This virtual environment acts as a layer between the application and the operating system, and eliminates application conflicts and application-OS conflicts. Examples include the Sun Java Virtual Machine, Softricity, Thinstall, Altiris, and Trigence.

Operating system-level virtualization involves virtualizing a physical server at the operating system level, enabling multiple isolated and secure virtualized servers to run on a single physical server. The guest OS environments may share the same OS as the host system, i.e. the same OS kernel is used to implement the guest environments. Applications running in a given guest environment view it as a stand-alone system. As a result, more virtual environments, containers, virtual private servers, and/or virtual dedicated servers may be supported on a given system.

Operating system-level virtualization may allow for the kernel of an operating system to have multiple isolated user-space instances instead of just one, so every user may work in their own space with the look and feel of having a real computer or server from the point of view of its respective user. This may allow each user to retain a degree of ownership over their own respective standard work environment, while making the most efficient use of the host's resources in a controlled environment.

Each virtual environment may have, as non-limiting examples, its own superuser (root or Administrator), set of users/groups, IP address(es), processes, files, applications, system libraries configuration files or any combination thereof. The file system may be structured so that all the information including centralized data storage, central backup and central email or any other divisions of the virtual environment may be stored in the home directory of the user on the host system. Because they rely on the services of a single kernel, all virtual environments on a given host system may run the same kernel, but everything else including, but not limited to system libraries, configuration and program files may vary among different virtual environments.

Examples of software or operating system-based virtualization may include but are not limited to OpenVZ, Linux-VServer, Parallels® Virtuozzo Containers, Solaris Containers, Solaris Zones, and FreeBSD Jails.

Conventional approaches to hosting multiple (e.g., hundreds or even thousands) of separate virtual computing environments fully virtualize the operating system for each virtualized instance or customer container. As a result, for each container loaded, a full operating system must be either launched (in full virtualization) or installed into the container root directory (in container based virtualization).

This has a number of downsides. For example, the machine hosting the virtualized system must hold caches for each virtual environment, which wastes memory. Second, when processes are started, shared libraries are loaded. Because multiple operating environments are loaded, the shared libraries are loaded multiple times—once for each container, even if they are the same library in a different file. Third, each container instance operating system must be individually managed, again requiring duplication of effort and resources. Also, it is not possible to perform a full deterministic upgrade/rollback of the operating system installation inside the container without a large amount of effort to snapshot the state on the instance.

What is needed, therefore, is a better way to design and manage large-scale implementations of virtualized machines being operated for multiple parties.

SUMMARY OF THE INVENTION

Various embodiments of the invention provide methods and systems for the efficient hosting of virtualized containers using read-only operating system images. To reduce resource usage and operational overhead, a single read-only OS image(s) is stored on disk and is shared among multiple running virtualized containers. Each running container interacts with the underlying shared files and resources in system storage, and caches of the OS image and shared libraries are held in RAM only once for each shared operating system image which is in use, regardless of how many containers are using the image.

Each container running on a server are provided the same OS image, which remains consistent among the containers by nature of it being backed by a single read-only image. Each OS image is named and uniquely versioned, and each container has a property in an associated configuration file which identifies the OS image to be used when the container is started. When updates to the OS are made, a new image may be generated, and the containers may be switched over to the new image by changing the appropriate configuration property associated with the container and restarting the container. Should as OS update fail, the container is halted and the configuration property is reverted back to a known good value and the container is restarted.

In another aspect, a portion of a shared image of a virtualized operating system may be associated with a virtualized application environment. A request is received to create a new virtualized application environment which includes a preferred operating system to support the virtualized application environment and a preferred version of the preferred operating system. In response to the request, the validity of the requested operating system is confirmed and the preferred version based on previously provisioned operating system images. If confirmed as valid, the requested version of the shared image of the operating system is activated as the operating system for the new virtualized application environment, and if not confirmed, a default version of the shared image of the operating system is activated as the operating system for the new virtualized application environment.

In another aspect, a system for provisioning an image of an operating system within a virtual machine environment in which a plurality of discrete system containers share access to one or more components of the image includes a container provisioning and management server. The server is configured to create a uniquely identifiable versioned directory to store an image of an operating system, add the imaged operating system and a mount script for initializing the image of the operating system into a bundled archive file and extract the imaged operating system into a master file repository store in each storage server such that the discrete system containers stored on each storage server share access to components of the imaged operating system.

The server may also receive requests to create new virtualized application environments, which include a preferred operating system to support the virtualized application environment and a preferred version of the preferred operating system. In response to the request, the server confirms the validity of the requested operating system and the preferred version. If confirmed as valid, the server activates the requested version of the shared image of the operating system as the operating system for the new virtualized application environment, and if not confirmed, activates a default version of the shared image of the operating system as the operating system for the new virtualized application environment.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, emphasis instead generally being placed upon illustrating the principles of the invention.

DETAILED DESCRIPTION

Terms are used within their accepted meanings. The following definitions are meant to clarify, but not limit the terms defined.

As used herein, the term "environment" refers to the computing system on which the invention operates. For example, the invention may be implemented in a computing environment including a number of generic computer servers in a datacenter.

As used herein, the term "administrators" refers to persons responsible for overseeing the virtualization solution described herein. Administrators may interact with a container from both inside and outside the container.

As used herein, the term "developers" refers to persons responsible for writing application code which runs inside the containers. Developers may deploy and run the application code inside a container, but generally do not have permission to modify the container.

As used herein, the term "customers" refers to users of the applications written by developers. Customers generally have no access to the system platform other than that provided by the software applications running in the container.

Figure 1:
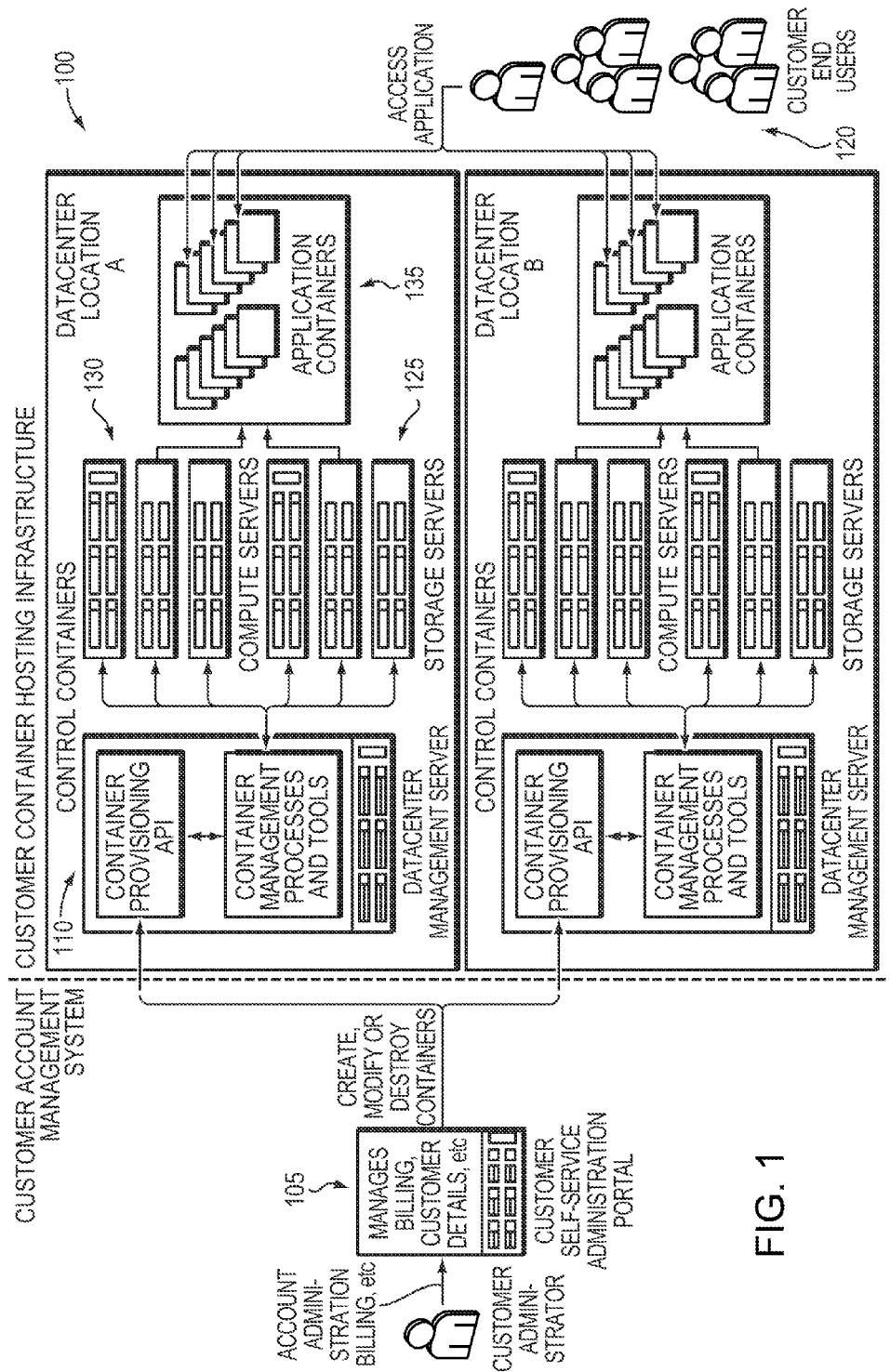
FIG. 1 is a diagram of a high-level system architecture according to an embodiment of the invention.

FIG. 1 illustrates one possible arrangement of a datacenter 100 in which various embodiments of the invention are implemented and operate. The datacenter typically includes customer account management systems 105 that are used to provide account administration, billing, customer service, quality assurance, and general information to the administrators and customers. The hosting infrastructure may, as illustrated, comprise more than one physical location (Location A and Location B) for purposes of performance, redundancy, cost efficiency, etc. Within each location, components of the hosting and provisioning systems are stored. This includes the container management application 110, operating on a datacenter management server used to provision and operate the containers on behalf of the customers 120, the physical storage devices 125 and computation devices 130, and specially allocated application containers 135. End users connect via a gateway, DNS or other named server that directs their application requests to the appropriate location, container and servers.

The setup and configuration of the container system may be divided into two processes, one involving actions prior to provisioning a virtualized container, and the other pertaining to events occurring at container creation and start-up. System administrators may be responsible for the initial setup of the OS image before containers are created or updated. Following image setup, the creation and starting of containers (after a request from a customer or administrator) may be automated.

Figures 2A, 2B:
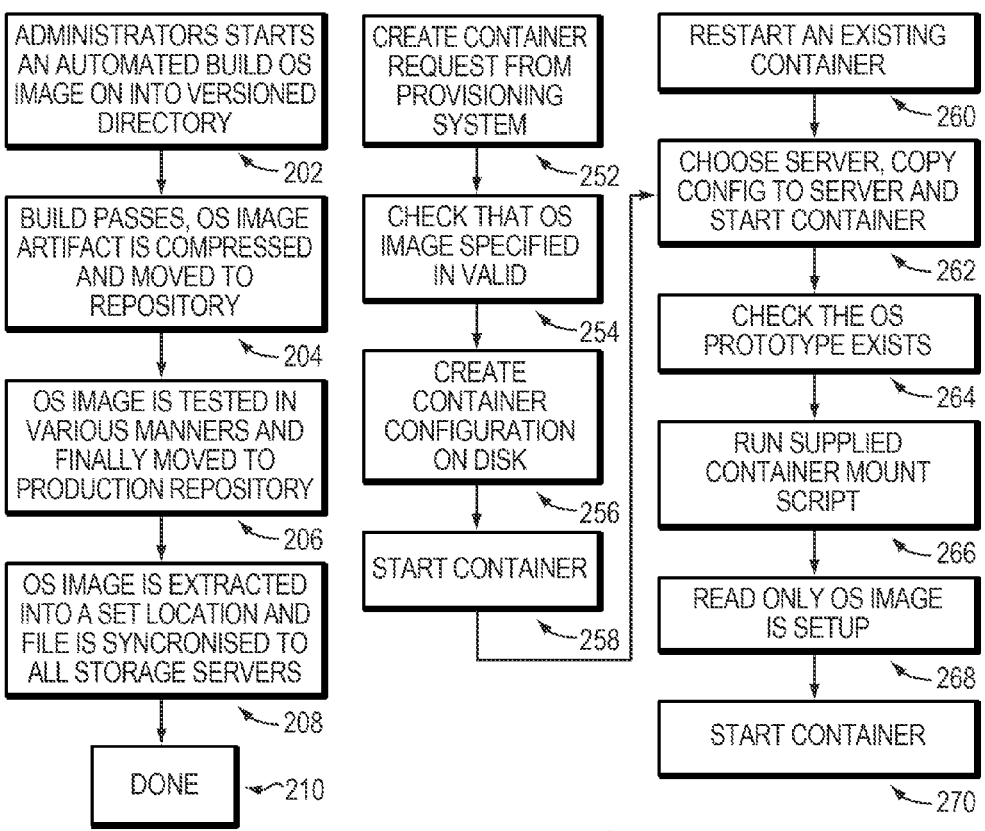
FIGS. 2A-2B are system setup flowcharts according to an embodiment of the invention.

An exemplary process for provisioning a container for hosting one or more customers is illustrated in FIG. 2A. In step 202, an administrator starts an automated build of an OS image into a versioned directory. For example, the OS image may be built into a directory entitled "root" within a parent directory on the file system, which is provided with a version name and number (e.g., "somepath/centos-5-v35/root"). The build is performed using automated tools which download the operating system base and then apply customizations such as authentication backends, addition/removal of packages, and the like.

After creation of the OS image is complete, a mount script may be added containing the steps necessary to start up the image, such as how to mount various directories (for Unix, Linux, and other Unix-based operating systems following the standard file system hierarchy, this may include /etc, /var and /tmp), set up environment variables for use in the container, and set the time zone of the instance. This script may be added to the base versioned directory described above.

In step 204, the base directory containing the OS image and start-up mount script is bundled into an archive (e.g., tar, gzip, zip, etc.), and moved into an OS image testing repository where it can be tested prior to moving into a production repository (step 206).

From the production repository, the archived OS image is extracted into the master file repository store in each datacenter and is distributed to the storage servers (step 208). Once distributed to all or a subset of the storage servers, the container creation and management tools are configured to activate the distributed OS image version as the default operating system for new and/or existing container instances which are created or managed in the system.

Now referring to FIG. 2B, when the provisioning system receives a new request for a container (step 252), it interacts with a provisioning application programming interface (API) associated with the local datacenters. The container may, for example, provide a virtualized application environment for development and/or execution of customer-facing applications. The container request from the provisioning system may indicate the OS image version to use for the container. The specified version is checked for validity in step 254, e.g., by determining whether an OS image with specified version exists and is available for use by container. In step 256, the provisioning API causes the creation of a new container configuration ("config") file that specifies, among other parameters, which OS image version to use, which may be the specified version or a default version.

Following container creation, several steps are performed to start up the newly created container. Container start-up may proceed after a new container is created (step 258), or, alternatively, the container start-up steps may be used to restart an existing container (step 260). In step 262, the newly- or previously-created config file is copied to the host server which has been selected to run the container, and the server is notified to start this container. Host servers may be selected randomly, by round-robin selection, based on actual or estimated server load, or any other suitable method of selection.

Upon container start-up, the container software determines the OS that will interface with the container. To ensure that the read-only OS image is made available to the starting container, the default OS mounting method is overridden in the container software. For example, when using OpenVZ for container creation, the present system overrides the default "premount" code in that software.

The replacement code performs a number of steps to complete start-up of the container. In step 264, the OS image specified in the config file is validated to ensure that the specified image exists on the same storage node as the customer data directory (or a storage node otherwise accessible to the data directory). A check is also made to determine whether the mount script exists in a predetermined directory path which matches the image archive. If the image is usable and the checks pass, the mount script supplied with the OS image is executed (step 266).

The mount script operates, in step 268, to setup the read-only OS image, including the following steps: (1) remove any existing mounts the container technology may have created; (2) create small (between 5 Mb and 200 Mb depending on needs) overlay memory file systems for locations that the OS expects to be writable (e.g., for a Linux OS, this includes /var, /etc, /tmp, /dev); (3) copy the default contents from the OS image into each of the overlay file systems; (4) set the time zone; (5) set environment variables which are in the container config file and need to be passed down into the running container (e.g., what environment the container is in: dev/stg/prod); (6) mount a read-only software repository into the container; and (7) mount a read/write container data directory into the container.

Assuming the mount script has completed successfully, control is then passed back to the container technology to continue to start the container as per its normal process (step 270).

Figure 3:
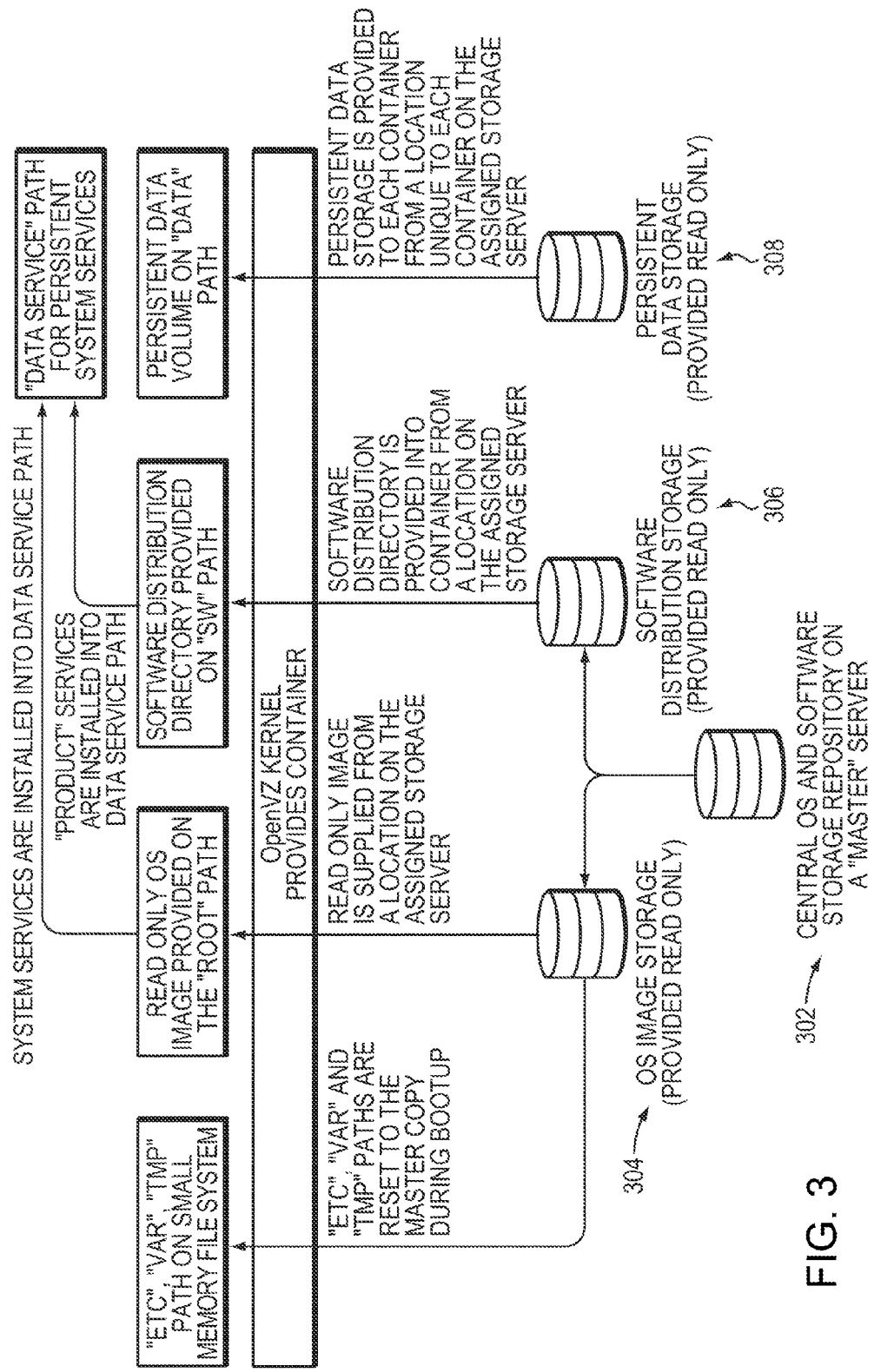
FIG. 3 is a diagram of a virtualized container system according to an embodiment of the invention.

FIG. 3 illustrates an exemplary implementation of the invention using OpenVZ virtualized containers with Linux. Master server storage 302 contains archived OS images and software for distribution to individual storage servers. Each datacenter may have one or more master servers in communication with the storage servers. In some embodiments, the master servers are remotely located from the local storage servers, and distribute the OS images and software via a long-distance communications medium. The master server may transmit new or updated OS images to OS image storage 304 located on each storage server, and may transmit new or updated software for use in the virtualized containers to software distribution storage 306. Software storage 306 may be located on the same or different storage servers containing OS image storage 304. Both storages 304, 306 may be provided to the containers in a read-only mode, such that the containers can access and mount/execute the OS images and software, but cannot delete or otherwise modify them.

The OS image storage 304, software storage 306 and persistent data storage 308 interact with the OpenVZ virtualized containers to provide the necessary components to achieve container start-up and continued operation. The OS image storage 304 supplies the OS image that is assigned to a container being started up and is made available to the container on the "root" path. Standard writeable directories in the file system hierarchy (including /etc, /var, and /tmp) are reset to the default contents as specified in the supplied OS image upon each startup. The software distribution storage 306 provides software for execution in the container and is provided on the "sw" path. Services required or otherwise used by the OS and distributed software are installed into the "data service" path used for persistent system services in the container. For read/write operations in the container, a persistent data volume from data storage 308 is mounted on the "data" path from a location unique to each container on an assigned storage server.

It is understood that the methods and systems described below may contain software and hardware connected to the Internet via a network. Computing devices are capable of communicating with each other via the Internet, and it should be appreciated that the various functionalities of the components may be implemented on any number of devices.

A communications network generally connects a client with a server, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, etc.), and so on. Preferably, the network can carry TCP/IP protocol communications, and HTTP/HTTPS requests made by a web browser and the connection may be made between the peers and communicated over such TCP/IP networks.

The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet 16, which may accommodate many different communications media and protocols.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, or another operating system of platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although internal components of the computer are not shown, those of ordinary skill in the art will appreciate that such components and the interconnections are well known. Accordingly, additional details concerning the internal construction of the computer need not be disclosed in connection with the present invention.

The foregoing discussion discloses and describes merely exemplary embodiments of the present invention. As will be understood by those skilled in the art, the present invention may be embodied in other specific forms without departing from the spirit or essential characteristics thereof. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

What is claimed is:

1. A method for provisioning an image of an operating system within a virtual machine environment in which a plurality of discrete system containers share access to one or more components of the image of the operating system, the method comprising the steps of:

creating a uniquely identifiable versioned directory to store an image of an operating system;

modifying the image of the operating system;

providing a mount script for initializing the image of the operating system, wherein the mount script is configured to:

allocate a plurality of file systems in memory, the file systems comprising locations writeable by the operating system;

copy default contents from the image of the operating system into each of the file systems in memory;

set environment variables for use by a particular discrete system container;

mount a read-only software repository into a particular discrete system container; and mount a read-write data directory into a particular discrete system container;

adding the image of the operating system and the mount script for initializing the image of the operating system into a bundled archive file;

initiating an update to one or more components of the image of the operating system by creating a new uniquely identifiable versioned directory to store an updated image of the operating system;

updating a configuration property of the discrete system containers associated with the updated image of the operating system;

extracting the image of the operating system into a master file repository store in each of a plurality of storage servers whereby the discrete system containers stored on each storage server share access to one or more components of the image of the operating system;

receive a request to create a new virtualized application environment, the request including a preferred operating system to support the virtualized application environment and a preferred version of the preferred operating system;

in response to the request, confirm the validity of the preferred operating system and the preferred version of the preferred operating system based at least in part on previously provisioned operating system images; and if the preferred operating system and the preferred version are confirmed as valid, select the preferred version of the preferred operating system to support the new virtualized application environment, and, if the preferred operating system or the referred version is not confirmed as valid select a default version of a default operating system to support the new virtualized application environment.

2. The method of claim 1 wherein modifying the image of the operating system comprises applying one or more customizations selected from the group of adding software components to the operating system and removing software components from the operating system.

3. The method of claim 1 wherein the operating system is Linux.

4. The method of claim 1 wherein the one or more components of the image of the operating system are cached and accessed simultaneously by the discrete system containers.

5. The method of claim 4 wherein the cached components are copies of read-only versions of the same component held in the master file repository store.

6. The method of claim 1 further comprising recognizing a failure of the updated image of the operating system.

7. The method of claim 6 further comprising halting any discrete system containers associated with the failed updated image of the operating system, reverting the configuration property to a previous version of the image of the operating system, and restarting the halted discrete system containers.

8. A system for provisioning an image of an operating system within a virtual machine environment in which a plurality of discrete system containers share access to one or more components of the image of the operating system, the system comprising:
one or more computers configured to:
create a uniquely identifiable versioned directory to store an image of an operating system;
provide a mount script for initializing the image of the operating system, wherein the mount script is configured to:
allocate a plurality of file systems in memory, the file systems comprising locations writeable by the operating system;
copy default contents from the image of the operating system into each of the file systems in memory;
set environment variables for use by a particular discrete system container;
mount a read-only software repository into a particular discrete system container; and
mount a read-write data directory into a particular discrete system container;
add the image of the operating system and the mount script for initializing the image of the operating system into a bundled archive file;
initiate an update to one or more components of the image of the operating system by creating a new uniquely identifiable versioned directory to store an updated image of the operating system;
update a configuration property of the discrete system containers associated with the updated image of the operating system;
extract the image of the operating system into a master file repository store in each of a plurality of storage servers whereby the discrete system containers stored on each storage server share access to one or more components of the image of the operating system;
receive a request to create a new virtualized application environment, the request including a preferred operating system to support the virtualized application environment and a preferred version of the preferred operating system;
in response to the request, confirm the validity of the preferred operating system and the preferred version of the preferred operating system based at least in part on previously provisioned operating system images; and
if the preferred operating system and the preferred version are confirmed as valid, select the preferred version of the preferred operating system to support the new virtualized application environment, and, if the preferred operating system or the preferred version is not confirmed as valid, select a default version of a default operating system to support the new virtualized application environment.

9. The system of claim 1 wherein the one or more computers are further configured to apply one or more customizations selected from the group of adding software components to the operating system and removing software components from the operating system.

10. The system of claim 9 wherein the operating system is Linux.

11. The system of claim 9 wherein the one or more components of the image of the operating system are cached and accessed simultaneously by the discrete system containers.

12. The system of claim 11 wherein the cached components are copies of read-only versions of the same component held in the master file repository store.

13. The system of claim 9 wherein the one or more computers are further configured to recognize a failure of the updated image of the operating system.

14. The system of claim 13 wherein the one or more computers are further configured to halt any discrete system containers associated with the failed updated image of the operating system, revert the configuration property to a previous version of the image of the operating system, and restart the halted discrete system containers.

* * * * *